Figure 1:
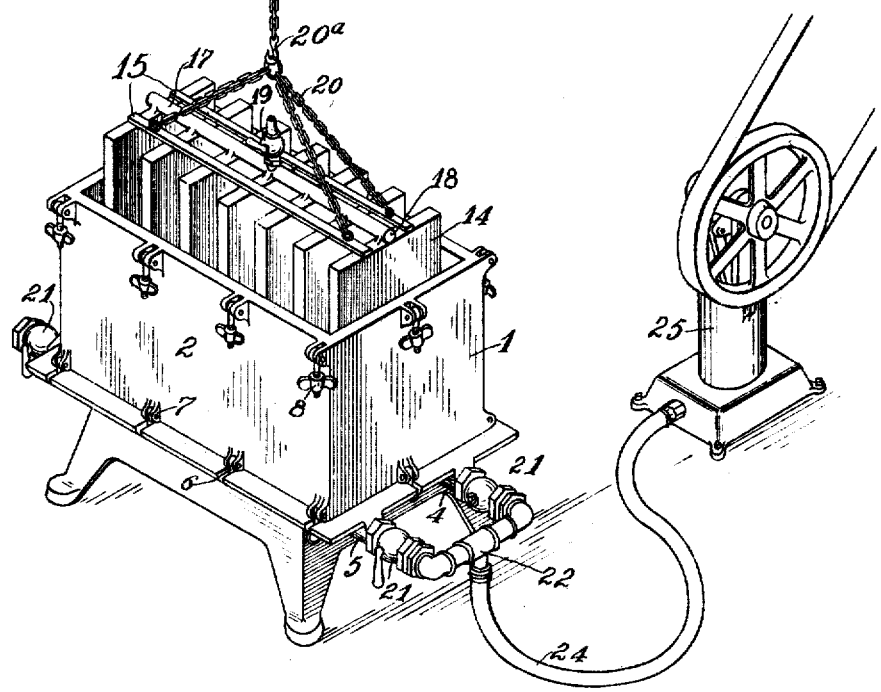

G. KNOCK.
PROCESS OF PACKING FILTERS.
APPLICATION FILED JULY 22, 1908.

918,867.

Patented Apr. 20, 1909.
2 SHEETS—SHEET 1.

WITNESSES:
Brennan B. West.
Arthur S. Remberg.

INVENTOR,
George Knock
BY Bates, Fouts & Hull,
ATTYS.

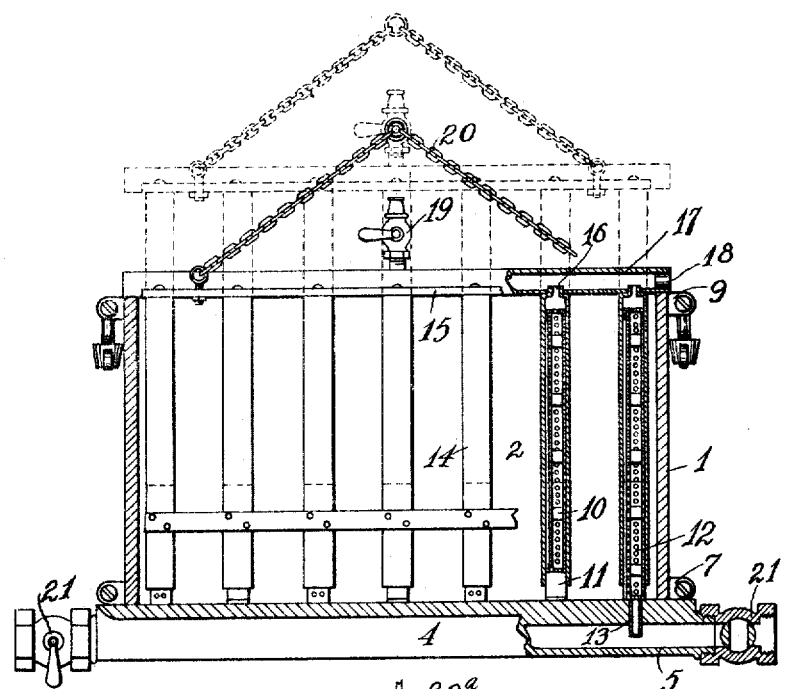
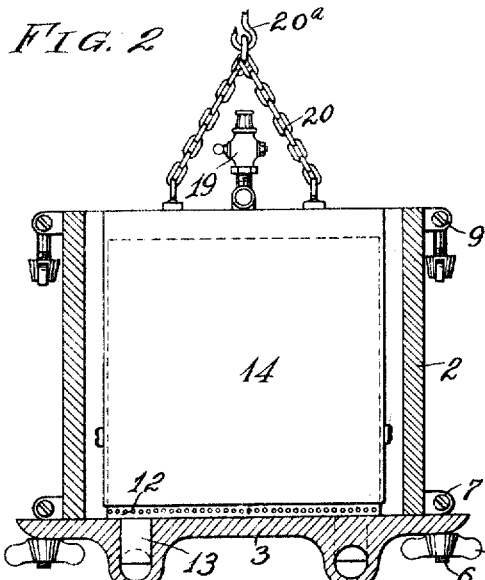

UNITED STATES PATENT OFFICE.

GEORGE KNOCK, OF CLEVELAND, OHIO.

PROCESS OF PACKING FILTERS.

No. 918,867.

Specification of Letters Patent.

Patented April 20, 1909.

Application filed July 22, 1908. Serial No. 444,700.

*To all whom it may concern:*

Be it known that I, GEORGE KNOCK, a citizen of the United States, residing at Cleveland, in the county of Cuyahoga and State of Ohio, have invented a certain new and useful Improvement in Processes of Packing Filters, of which the following is a full, clear, and exact description, reference being had to the accompanying drawings.

This invention relates to a process of packing filters whereby the filter mass may be quickly packed into a filter and, when so packed, will be of uniform density throughout.

While my process probably will be applicable for filtering other fluids than beer, a wide field of utility therefor resides in connection with the filtering of this particular fluid. In the operation of filters which are used for filtering beer, the liquid is forced under pressure through the filter mass, which is generally composed of moist pulp. In such filters, it is very essential that the filter mass shall be spread evenly and shall be of uniform density or compactness throughout, so that there may be no weak spots; for if such spots should develop, paths of least resistance for the beer will be provided, allowing the beer to pass therethrough unfiltered or ineffectively filtered and thus destroying the effectiveness of the filter.

In an application filed contemporaneously herewith, there is shown a filter comprising a body or tank having a plurality of perforated inlet and outlet filter members, each of which occupies the greater portion of the transverse area of the tank, in order that relatively large capacity may be obtained. The inlet members are connected with a common inlet pipe for supplying unfiltered beer thereto and the outlet members with a common outlet pipe for the filtered beer. - It has been proposed to pack a filter of this general type by applying suction thereto during the operation of placing the filter mass within the filter tank. Obviously, in order that suction applied to either set of members may be effective, it is necessary that the vacuum produced by such suction shall not be broken and that therefore the members shall be substantially covered with the filter mass before the application of suction thereto, as otherwise the mass will not be drawn and packed around such members. While the application of suction to the filter during the operation of packing the same has facilitated such packing, nevertheless instances have occurred where filters packed in the manner above described do not operate successfully, as the tendency is to pack the mass more compactly at the tops of the members than at the bottoms thereof and to leave the mass so relatively loose near the bottom of the filter tank as to develop weak or loose spots through which the beer can flow from the inlet to the outlet members without being effectively filtered.

It is the object of this invention to so improve the process referred to as to secure uniform packing throughout the entire body of the filter. Generally speaking, this is accomplished by exposing only a portion of the perforated surface of each filter member to the action of the suction device and covering such exposed portion with the filter mass, applying suction to the filter mass thus applied, then exposing another portion of the mass-covered perforated surface of each filter member and applying suction as before. In this manner, the filter body or tank is packed with a filter mass, successive layers of which have been drawn against successive exposed portions of the filter members, with the result that the entire mass of filtering material in the packed filter tank is uniformly compacted throughout, thereby avoiding the presence of any weak or loose spots and insuring the efficient filtration of the beer or other liquid. This operation, constituting the present invention, is illustrated herein as applied to a filter of the type shown and more fully described in the application hereinbefore referred to.

As shown in the drawings, Figure 1 represents a perspective view of a filter having the invention applied thereto, together with a suction pump, and showing the operation of packing the filter; Fig. 2 represents a longitudinal vertical sectional view through the filter shown in Fig. 1, one of the adjusted positions of the hood-carrying frame and the hoods thereon being shown in dotted lines; and Fig. 3 represents a vertical transverse sectional view through said filter and frame.

The filter disclosed in the drawings consists of a tank having ends 1, sides 2, and a bottom 3, with a suitable cover (not shown). The bottom is provided with a pair of pipes 4 and 5, which may be conveniently cast therewith, as indicated in the drawings. The former pipe is the inlet pipe through which the beer or other liquid to be filtered is applied to the filter, and the latter is the outlet pipe through which the beer or other liquid is discharged after having been filtered. To facilitate the removal of the filter mass when necessary to repack the filter, the bottom 3 may be detachably supported from the sides 2 by means of bolts 6 pivoted to lugs 7 on the sides and adapted to swing into suitable recesses formed in the laterally projecting sides and ends of the bottom, each of said bolts being provided with a suitable wing nut 8. The sides are provided at their upper ends with similar lugs 9 for bolts (not shown) by which the cover may be clamped in place.

Pipe 4 has connected thereto a number of perforated inlet filter members 10. These members are generally rectangular in shape and are of substantially uniform width from top to bottom thereof and are each provided with a connection 11 communicating with pipe 4. This connection extends upwardly a short distance above the bottom 3, carrying the filter member 10 at its upper end. Outlet pipe 5 has connected thereto a number of perforated outlet members 12, the bottoms of said members being in substantial contact with the bottom 3 and each of said members having a connection 13 at one side thereof communicating with pipe 5. The inlet and outlet members are staggered, as shown, and the respective pipes therefore may be located at opposite sides of the bottom plate 3.

For the purpose of securing the uniformity in the consistency and density of the packing hereinbefore referred to, I provide each of the members with a hood 14. Each hood conforms in shape to the member with which it is to be used and is closed at the top and open at the bottom. The open bottoms are all preferably in the same horizontal plane and the closed tops are connected to a frame 15, which is adapted to rest on top of the filter box, by means of nipples 16 communicating with a pipe 17 supported by said frame. The ends of the pipe are closed, as by caps 18, and said pipe is provided preferably at the middle thereof, with a valve-controlled connection 19.

20 denotes a chain bridle connected to the frame, by means of which the frame and the attached hoods may be raised and lowered by any suitable mechanism, a pulley hook 20ª being shown as attached to a ring carried by the bridle.

The pipes 4 and 5 are each provided at opposite ends thereof with valves 21.

22 denotes a Y-connection, the opposite ends of which may be detachably connected to the ends of pipes 4 and 5, as by unions. This connection is provided with a flexible pipe 24 connected to a suction pump 25.

With the parts arranged as described, the operation will be as follows:—Frame 17 is lowered until it rests on top of the filter tank. The frame is of open-work construction whereby the filter mass may be readily introduced therethrough. When the frame is resting upon the filter tank, the lower ends of the hoods are a slight distance above the bottom of the tank, say two inches. The filtering material is introduced through the frame into the tank preferably until the tank is filled. Suction is then applied to the pipes 4 and 5, the valves at the ends of said pipes opposite the Y 22 being closed. This suction draws the lower portion of the filter mass toward the exposed perforated areas of the filter members. When sufficiently packed at this point, valve 19 is opened to break the vacuum in the hoods and frame 15 is raised a short distance, say two inches. Valve 19 having been closed, the suction exerted by the pump will pack the filter mass corresponding to the newly exposed portions of the filter members compactly around said members. This operation is repeated until the hoods have been withdrawn from the upper ends of the filter members and thereafter upon the filter mass above such members, with the result that the filter tank, when full, will be provided with a filter mass which is firmly packed and which is of uniform density throughout. The last suction will, of course, be applied after the removal of the hoods from the tank and the mass will be drawn into place by the suction through the upper perforated ends of the filter members. The cover will then be applied, the filter tank will be disconnected from the suction pump, and the filter will be ready for use.

The apparatus shown herein forms the subject matter of my co-pending application Serial No. 444,699, filed July 22, 1908.

Having thus described my invention, I claim:

1. The process of packing a filter, consisting in subjecting successive portions of the filtering material to suction acting entirely beneath the exposed surface of such material.

2. The process of packing a filter, consisting in subjecting successive horizontal layers of filtering material to suction acting entirely below the upper surface of each layer.

3. The process of packing a filter having a perforated member consisting in exposing successive portions of the perforated area of said member to the filter mass and applying suction to said members.

4. The process of packing a filter having a tank and a plurality of perforated members therein, consisting in simultaneously exposing to the filter mass successive portions of the perforated areas of said members and maintaining a suction through all of said members simultaneously.

5. The process of packing a filter having a tank and a vertically extending perforated filter member therein, consisting in exposing successive portions of the perforated area of said member from the bottom toward the top thereof to the filter mass and applying suction to said member.

6. The process of packing a filter having a tank and a perforated filter member therein, consisting in applying to said member a cover, moving said cover along such perforated member to expose successive portions thereof to the filter mass, applying suction to said member, and breaking the vacuum within said cover prior to moving the same.

7. The process of packing a filter having a tank and a perforated filter member therein, consisting in applying to said member a cover, moving said cover along such perforated member to expose successive portions thereof to the filter mass, and applying suction to said member.

8. The process of packing a filter having a tank and a plurality of vertically extended perforated filter members therein, consisting in applying coverings to said members, successively moving said coverings to expose successive portions of the perforated areas of said members from the bottom upwardly to the filter mass, and applying suction to said members.

9. The process of packing a filter having a tank and a plurality of vertically extending perforated filter members therein, consisting in applying coverings to said members, successively moving said coverings to expose successive portions of the perforated areas of said members from the bottom upwardly to the filter mass, sealing such exposed areas with the filtering mass, applying suction to said members and breaking the vacuum produced within said coverings by such suction prior to moving the coverings upwardly.

In testimony whereof, I hereunto affix my signature in the presence of two witnesses.

GEORGE KNOCK.

Witnesses:
J. B. HULL,
CHAS. W. BROWN.